March 10, 1964

J. D. HORSCH ETAL 3,123,943

GAUGING APPARATUS

Filed Aug. 22, 1961

INVENTORS
HAROLD W. FERCHLAND
JOHN D. HORSCH
BY Edward H. Goodrich
THEIR ATTORNEY March 10, 1964   J. D. HORSCH ETAL   3,123,943
GAUGING APPARATUS Filed Aug. 22, 1961   2 Sheets-Sheet 2

INVENTORS
HAROLD W. FERCHLAND
JOHN D. HORSCH
BY Edward H. Goodrich.
THEIR ATTORNEY

United States Patent Office 3,123,943
Patented Mar. 10, 1964

3,123,943
GAUGING APPARATUS
John D. Horsch and Harold W. Ferchland, Birmingham, Mich., assignors to General Motors Corporation, Detroit, Mich., a corporation of Delaware
Filed Aug. 22, 1961, Ser. No. 133,094
15 Claims. (Cl. 51—165)

This invention relates to gauging and more particularly to a gauging apparatus for measuring the size of a work piece during a grinding operation thereon and which controls the grinding of a work surface to a required size.

With recent developments of ultraprecision guiding mechanisms such as the gyroscope controls used in long range missiles, there is demand for unprecedented accuracies in the grinding of surfaces of revolution. For example, ball bearings as used in gyroscope are frequently required wherein the coaxial relation of the race rings during high speed bearing operation must lie within a radial tolerance of a few millionths of an inch. Heretofore, gauging mechanisms which have been used to measure the diameter of a surface of revolution while being ground, have been securely mounted for reference on the base or on the work head of the grinding machine. It is well recognized that even the most accurate of grinding machines have workhead spindles which radially shift slightly during high speed rotation due to the fact that a free running high speed bearing usually has at least a minute extent of radial play. Also, a lubricating film within such a bearing changes in thickness under the radial load applied against the bearing during the usual grinding operation on a work piece rotatably supported by a work head spindle. Consequently, prior grinding machines used in conjunction with even the most accurate of gauges which measure the work size during grinding, could not produce the extreme accuracies now required since the response of these gauges was inaccurately affected by the small radial runout that is present in even the most accurate work spindle bearings.

It is, therefore, an object of this invention to provide an improved gauging mechanism which accurately responds to the size of the work surface being ground.

It is a further object to provide an improved gauging mechanism for accurately measuring minute changes in work size during a precision grinding of a surface of revolution thereon and which is unaffected by any radial shift of a work supporting spindle during the grinding operation.

It is a further object of this invention to provide a gauge for measuring change in size of a work surface of revolution during a grinding operation thereon and which gauge is referenced from a predetermined radial position with respect to the axis of work rotation irrespective of any shifting of this work axis.

It is a still further object of this invention to provide a gauging mechanism for controlling the grinding of internal and external surfaces of revolution on the same work piece within extremely close limits of accuracy.

It is a still further object of this invention to provide a gauge for measuring a surface during rotation about an axis and for measuring the angular relation of an element of this surface with respect to the axis of rotation.

To these ends and also to improve generally upon devices of the character indicated, the invention consists in the various matters hereinafter described and claimed. In its broader aspects, the invention is not necessarily limited to the specific constructions selected for illustrative purposes in the accompanying drawings wherein:

Figure 1:
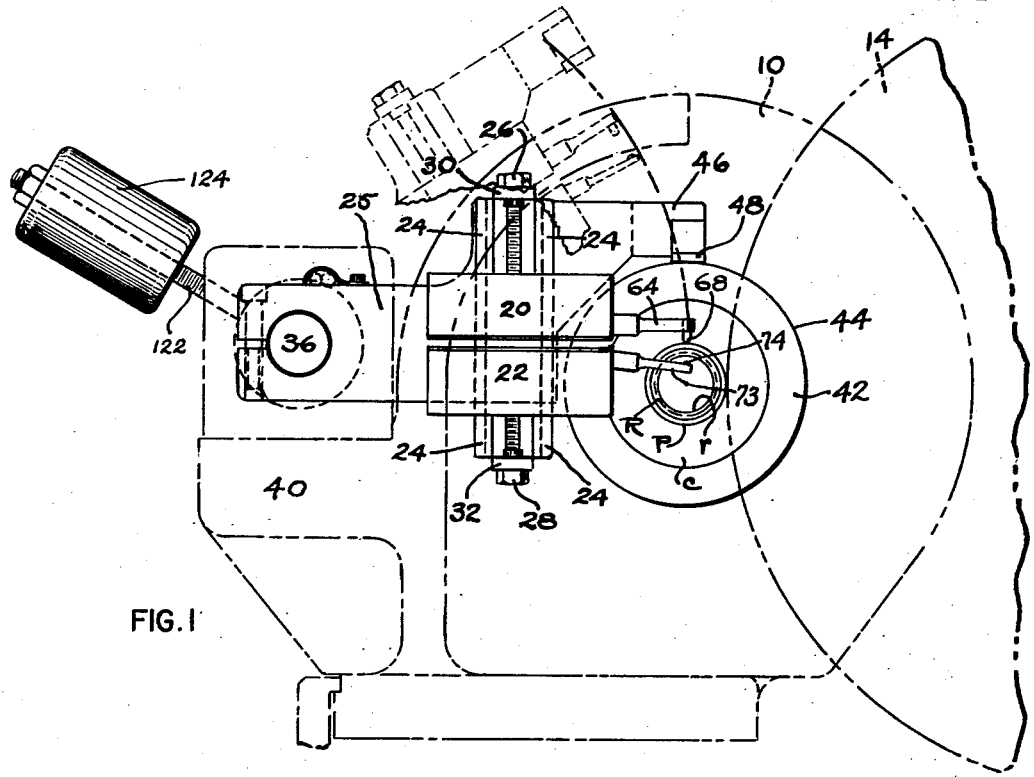
FIGURE 1 is an end view of our invention for accurately controlling the concentric grinding of the inner and outer surfaces of a ring.

This invention is particularly adapted to concentric grinding operations on the inner and outer surfaces of revolution of a ring-shaped member as the race ring R for a ball bearing where extremely close accuracies as to size and concentricity must be obtained. The race ring R is herein illustrated as an outer race ring having a cylindrical peripheral surface P and an inner raceway r. The race ring R may be supported by an end face of the ring gripped by a magnetic chuck C secured to a rotatable spindle S mounted on precision bearings in a work head 10 and rotatably driven as by a motor 12 in accordance with conventional practice. The periphery P which is usually cylindrical, may be ground to size by a grinding wheel 14 suitably driven and carried by a wheel slide on the grinding machine and fed radially of the work in accordance with usual grinding methods. Similarly, a smaller grinding wheel as 16 and carried by another wheel slide may be entered within the work and fed radially thereof to produce the internal grinding operation. It should be understood that the gauging arrangement associated with this grinding machine is adaptable to measuring any surface of revolution during grinding whether internal or external for controlling the concentricity of both internal and external surfaces as herein shown.

As illustrated, there is provided a pair of similar gauge heads 20 and 22 slidably mounted on spaced vertical tracks 24 on a gauge arm 25. Screws 26 and 28 journalled in and axially positioned by laterally projecting ears 30 and 32 on the arm 25, threadably engage and precisely vertically position the gauge heads 20 and 22 with respect to the arm 25. The rearward end of the arm 25, which may be substantially horizontal, is fastened as by clamping to a horizontal pivot shaft 36 parallel to the axis of the work head spindle S and journalled in precision bearings in a housing 38 formed in a laterally-offset bracket 40 on the work head 10. A reference disc 42 is secured to the work head spindle adjacent to the magnetic chuck C and behind the race ring R. This reference disc, which preferably is much larger than the diameter of the ring R to be ground, has a hardened peripheral surface 44 which may be ground cylindrical by the grinding wheel 14 while this reference disc is mounted on the work spindle. With this arrangement, the peripheral surface 44 lies precisely coaxial of the axis of the ring R when the ring has been centered on the chuck C. A laterally projecting portion 46 on the forward upper end of the arm 25 has secured to its underside a hard wear-resistant shoe 48 which may be of tungsten carbide or similar material. This shoe has a flat under surface riding in element-contact with the hardened peripheral surface 44 to position the pivoted arm 25 and thus locate the gauge heads 20 and 22 with respect to the axis of the work spindle. The element-contact engagement of the hardened shoe 48 with the disc 42 is preferably vertically above the axis of the work spindle. With this construction, the work disc 42 maintains a definite position of the preadjusted gauge heads 20 and 22 with respect to the work since the arm 25 is referenced on the disc 42 irrespective of any radial runout of bearings on the work head spindle. It will be appreciated that the axis of the pivot shaft 36 is sufficiently laterally displaced outwardly from the axis of the work spindle so that the position of the arm 25 and the gauge heads 20 and 22 is not affected by any small radial displacement of the axis of the work spindle.

The gauges 20 and 22 are similar in construction except for their interchangeable gauge fingers which are shaped to properly locate the gauge point on the surface being ground. The gauge 22 is located upside down with respect to the similar gauge 20. Referring to the gauge 20 which responds to the outside diameter of the ring R during grinding, there is provided a casing 54 that is precisely positioned on the support arm 25 by the adjustment screw 26. A block 56 is secured to the casing within the upper end of a recess 57 located at the forward end of the casing and has sloping end faces to which are fastened the upper ends of a pair of downwardly sloping crossed reeds 58 herein illustrated as crossed flat springs. The lower ends of these resilient reeds are individually and securely fastened to the sloping end faces of a block 60 secured to the forward end of a horizontally disposed gauging arm 62. If desired, there may be several reeds located in alternating relation. With this crossed reed mounting, the arm 62 is pivotally supported about a fixed axis determined by the crossed relationship to these reeds. A gauge finger 64, demountably secured at its rearward end to the forward end of the arm 62, extends generally horizontally outwardly through a free aperture 63 in the forward end of the casing and forms a continuation of the arm 62. This casing aperture is sufficiently large so that it will not impede the normal tiltable movement of the gauge arm 62 and finger 64 during gauging. A downwardly directed stud 66 is secured to and extends from the forward end of the finger 64 and is provided at its lower end with a hardened gauge point 68 arranged to ride on the ring's periphery P during a grinding operation. This gauge point 68 may comprise a diamond or other suitable hard material that will not detrimentally wear during a gauging operation. A flexible sleeve 70 of rubber or other suitable flexible material, surrounds the gauge finger 64 in spaced relation and has its ends fitted over a casing flange and over an annular flange 72 on the finger to exclude dirt, water, and other deleterious materials from entering the casing through the space surrounding the movable gauge finger 64. Similarly, the lower gauge 22 is provided with a gauge finger 73 having a hardened gauge point 74 arranged to engage the inner surface of the ring R during the internal grinding operation.

Figure 4:
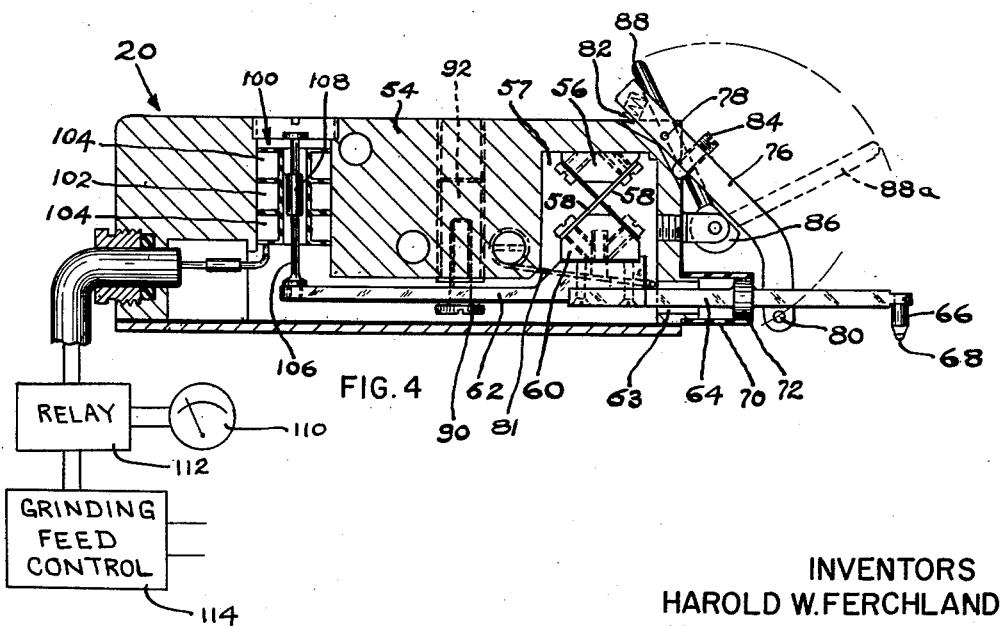
FIGURE 4 is a cut-away view of the gauge mechanism.

A gauge finger lifting arm 76, pivotally secured to the forward upper end of the casing as by a pin 78, has a downwardly projecting lower end from which laterally extends a pin 80 that may support the finger to limit the bottom position of the gauge point 68 when the gauge is lifted away from the work. A spring 81, fulcrumed on a stud in the casing 54, resiliently engages the finger 64 to urge the gauge point 68 downwardly against the work surface being gauged. A spring 82 between the casing and the upper end of the arm 76 tends to swing this arm clockwise to a position limited by an adjustment screw 84 threaded through the arm and which locates the position of the pin 80. A cam 86 journalled in a yoke member in the forward portion of the casing beneath the lever 76 is manually operated by a lever 88. When the gauge point 68 is lifted from the work, the lever 88 is located in its lower dash-line position 88a at which time the cam 86 tiltably shifts the lever 76 to a counterclockwise position where the pin 80 lifts and supports the finger 64. During gauging, the lever 88 is swung counterclockwise and upwardly to its full position shown in FIGURE 4 thus locating a flatted portion of the cam in spaced relation to the arm 76 and positioning the cross pin 80 at its lowermost position wherein the pin 80 is out of finger-supporting engagement due to the support of this finger by the gauge point 68 on the work. An adjustable stud 90 freely extends through a hole in the arm 62 and out of contact with this arm and is adjustably threaded in a nut 92 which in turn is threaded in the casing. This stud and nut are adjusted to limit the maximum swinging movment of the arm 62. The head of the stud and the bottom of the nut 92 are in spaced location to the arm 62 during a gauging operation.

In the rear of the casing 54, there is provided a vertical bore containing a transformer 100 wherein the inductive relation between windings is affected by a small movement of the lever arm 62 in response to a minute change in work size. This transformer comprises an annular primary winding 102, in coaxial relation axially between a pair of secondary windings 104, these windings being in close inductive coupled relation. A stem 106, secured at its lower end to the rearward end of the arm 62, projects upwardly between these windings and carries an armature 108 coaxial of the windings and in radially spaced relation thereto. This armature may be made of a suitable magnetizable or paramagnetic material which is preferably cylindrical and whose length slightly exceeds that of the axial length of the intermediate primary coil 102. With this arrangement, a slight vertical movement of the armature 108 in response to a pivotal movement of the gauge arm 62 under control of work size, upsets the inductive relation between the primary and secondary coils. Preferably, the length of the arm 62 from its crossed-reed pivotal support exceeds the length of the finger 64 thus amplifying the vertical movement of the armature 108 in response to a slight movement of the gauge point 68 on the work. The inductive relation between the primary and secondary coils may be registered on a gauge such as an electric meter 110 which is preferably graduated to show minute differences in work size. Also, this inductive relation may control a relay 112 which in turn controls switches regulating the extent of a grinding feed control mechanism 114 thereby stopping the infeed of the grinding wheel when the work piece reaches precisely the predetermined size under control of the position of the gauge point 68.

The pivot shaft 36 may be provided at its rearward end with an annular flange 120 from which a rod 122 laterally extends outwardly. A weight 124 adjustably secured on this rod 122 partially counterbalances the gauge supporting arm 25 and gauge mechanism so that the hardened work supporting shoe 48 on the gauge arm rides lightly on the periphery 44 of the reference disc 42 during a grinding operation. This also reduces any tendency for wear between the gauge disc and the shoe 48 which contact is usually lubricated by the abundance of lubricant supplied from the grinding zone. The angular relation of the rod 122 and weight 124 with reference to the gauge arm 25 is such that when the gauges are removed from the work, the weight 124 will be swung downwardly to a position where it overbalances the gauge mechanism and supports the gauge arm 25 and associated gauges in an upwardly tilted position to facilitate loading and unloading of the work as indicated in dot and dash lines at the upper part of FIGURE 1.

To facilitate location of the gauge points 68 and 74 at the proper positions axially on the work, the pivot shaft 36 is axially shiftable in its bearings and the shoe 48 has its flat reference disc engaging surface considerably longer than the width of the reference disc. A spring 126 mounted on a bracket 130 secured to the base of the grinding machine resiliently engages a side of the flange 120 urging the pivot shaft and associated gauge mechanism towards the left to a position limited by an adjustable micrometer head 132 whose stem 134 is engageable with the outer flat end face of the flange 120. Hence, with this micrometer head locked in preadjusted position as by a nut 136, the entire gauge mechanism may be shifted toward the right with the gauge points located forwardly of the work, after which the shaft 36 may be partially rotated to bring the shoe 48 downward into reference riding relation on the disc periphery 44. Thereafter, the pivot shaft 36 may be axially slid back to its preadjusted location determined by the micrometer head 132.

Since the length of the flat shoe 48 greatly exceeds the width of the reference disc periphery 44, the gauge point on the work surface may be laterally traversed across the work under control of the micrometer head and the meter 110 will accurately indicate the extent of lateral taper or transverse curvature of the surface being gauged.

There is also provided a gauge member 140 having a spring-urged plunger 142 engaging the rearward face of the flange 120.

Figure 2:
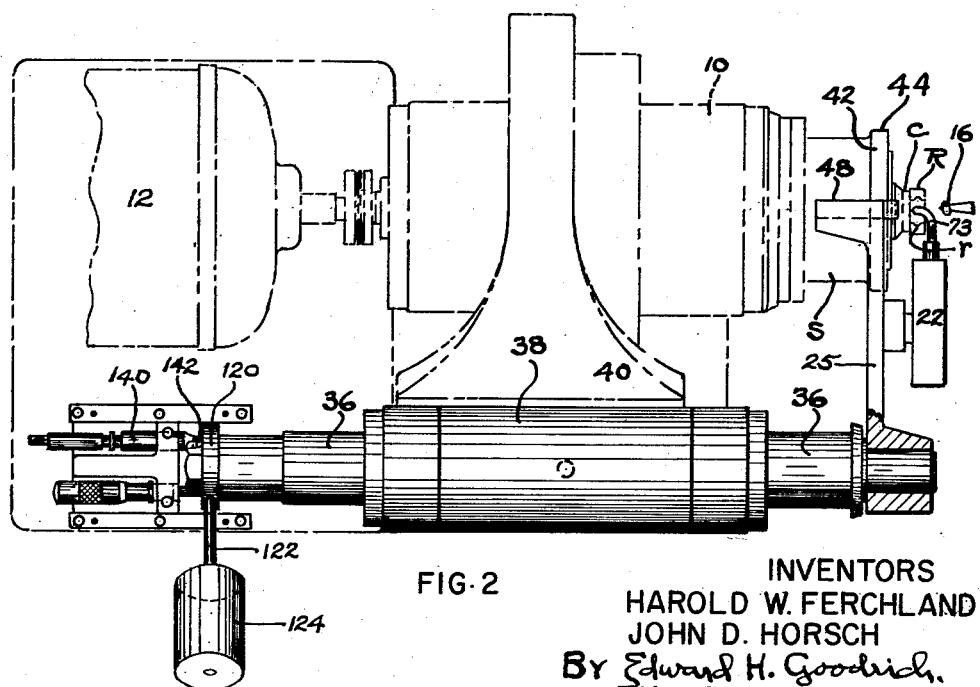
FIGURE 2 is a plan view of the invention.
Figure 3:
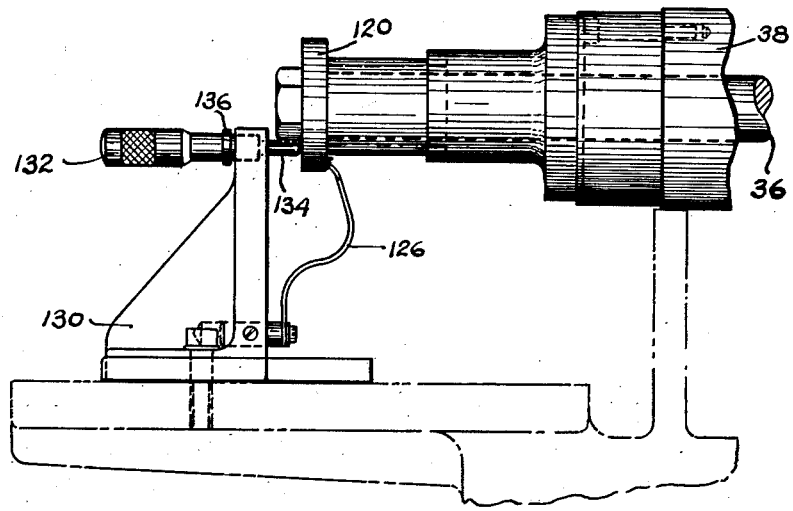
FIGURE 3 is a fragmentary view showing the axial adjustment of the gauge.

In operation, the ring R to be ground is placed with its end face against the chuck C and through the use of standard mechanical gauges is located substantially coaxial with the axis of the spindle S. At this time, the gauges 20 and 22 are swung upwardly away from the work as indicated by dot and dash lines at the top of FIGURE 1 and each gauge finger positioning lever 88 is located at its dash-line inoperative position indicated in FIGURE 4. The shaft 36 is then axially shifted towards the right (FIGURE 2) and the gauge arm 25 is thereafter swung downwardly to slidably support the flat bottom face of the shoe 48 on the periphery of the reference disc 42. This positively locates both gauging heads with reference to the spindle axis. The shaft 36 is then shifted towards the left (FIGURE 2) thus locating the gauge point 68 above and out of contact with the periphery of the work piece R and at the same time locating the inner gauge point 74 within and spaced from the inner work surface. The lever 88 of the upper gauge 20 is then shifted counterclockwise to position 88 supporting the gauge point 68 on the work periphery. A slow rotation of the work now indicates on meter 110 the radial runout, if any, of the work piece with respect to the spindle axis thus giving the operator a chance to further adjust the work piece on the chuck C precisely coaxial with the work spindle axis. If necessary at this time, the micrometer head 132 may also be adjusted to locate the gauge point in the desired position laterally of the work surface to be ground. Also, the entire gauge 20 may be vertically adjusted if necessary to preset the reading on the meter 110. A grinding operation is thereafter performed on the work periphery with the grinding wheel 14 under control of the gauge 20. At this time, the gauge point 74 within the work is, of course, maintained out of work contact. After the external surface has been ground to predetermined size, the grinding wheel 14 and the gauge point 68 are removed from the work. The inner gauge point 74 on the gauge 22 is thereafter placed in contact with the inner surface of the work. The grinding wheel 16 is then axially positioned within the work and radially fed into the work to produce the desired internal diameter and contour of the work. It will be appreciated with this arrangement that accurate concentricity is maintained between the inner and outer ground surfaces. If desired, the inner surface may be ground first. As illustrated, the grinding wheel 16 is shaped to form-grind the inner raceway r in the ring R. The adjustment of the micrometer head 132 facilitates the precise placement of the inner gauge point at the bottom of this raceway during grinding.

We claim:

1. In combination with a grinding machine having a rotatably driven spindle, means on the spindle for supporting and rotating a work piece during the grinding thereon of a surface of revolution coaxial with said spindle, a circular reference disc coaxial with and fastened on said spindle, bearing means on the grinding machine laterally spaced from and parallel to the axis of spindle rotation, an arm pivotally supported at one end by said bearing means, a shoe on the other end of the arm in element-engaging contact with the reference disc above the spindle axis, a gauge mechanism mounted on the arm between the shoe and the pivoted end of the arm, a movable gauge finger in said mechanism, and a gauge point on said finger engageable with the surface being ground in the plane of said spindle axis and said element contact.

2. In combination with a grinding machine having a rotatably driven spindle, means on the spindle rotatably supporting a work piece during the grinding of a surface of revolution on the work piece coaxially of said spindle, a circular reference disc coaxial with and secured to the spindle, an arm mounted at one end for pivotal movement about a fixed axis in the grinding machine parallel to and laterally spaced from the spindle axis, a shoe portion on the other end of said arm slidably supported on the top of said disc, a gauge head adjustably positioned on an intermediate portion of said arm, mechanism for vertically adjusting the gauge on said arm, a movable gauging finger responsive to the radius of said surface of revolution, and a gauge point on said finger engageable with the surface of revolution in the plane defined by the spindle axis and the engagement of the shoe with said disc.

3. In combination with a grinding machine having a rotatably driven spindle, means on the spindle for coaxially supporting and rotating a work piece during the grinding of a surface of revolution thereon, a circular reference disc secured to the spindle and having a cylindrical periphery coaxial with the axis of spindle rotation, a substantially horizontal arm mounted at one end for pivotal movement about a fixed axis on the grinding machine parallel to and laterally spaced from the spindle axis, a shoe portion on the other end of said arm slidably supported by the periphery of the rotating disc above the spindle during a grinding operation, a gauge head adjustably mounted for vertical movement on said arm, a movable gauging finger extending from the gauge head, a gauge point on the finger engageable with the surface being ground, and means on the gauge head to shift the gauging finger into and out of gauging position.

4. In combination with a grinding machine having a rotatably driven spindle, means on the spindle coaxially supporting and rotating a work piece during the grinding of a surface of revolution thereon, a circular reference disc coaxial with and secured to the spindle, an arm mounted at one end for pivotal movement about a fixed axis on the grinding machine parallel to and laterally spaced from the spindle axis, a shoe portion on the other end of the arm supported by the rotating disc periphery above the spindle during a grinding operation, a gauge head vertically adjustable on said arm, a movable gauging finger laterally projecting from the gauge head, a gauge point on said finger engageable with the surface of revolution being ground, and manually positioned cam means to shift the gauging finger into and out of operative position.

5. In combination with a grinding machine having a rotatably driven spindle in a work head, a chuck on the spindle for rotatably supporting a work piece during the grinding to size of a surface of revolution thereon coaxial with the spindle axis, a reference disc secured on the spindle adjacent the chuck and having a cylindrical periphery coaxial with the spindle axis, bearing means in the work head axially parallel to the spindle and laterally offset from said reference disc, a horizontally disposed arm pivotally supported at one end by said bearing means, a shoe mounted on the other end of the arm and having a flat face slidably supported in element-engagement on the disc periphery, and a gauge mechanism adjustably mounted on the arm between said shoe and the pivoted end of the arm and having a movable gauge point riding against and responsive to a change in size of said surface of revolution.

6. In combination with a grinding machine having a horizontally disposed rotatably driven spindle in a work head, a chuck on the spindle for rotatably supporting a work piece having a surface of revolution arranged to be ground concentric with the spindle axis, a reference disc secured to the spindle adjacent the chuck and having a cylindrical periphery coaxial with the spindle axis, bearing means in the work head axially parallel to the spindle axis and laterally offset from the reference disc, a horizontally disposed arm pivotally supported at one end by said bearing means, a shoe on the other end of said arm and having a flat face slidably supported in element-engagement with the top of the disc above the spindle axis, gauge mechanism vertically adjustable on said arm and responsive to a change in diameter of said surface of revolution during grinding, and means to adjust the gauge mechanism to a predetermined position axially of said surface of revolution.

7. In combination with a grinding machine having a rotatably driven spindle in a work head, a chuck on the spindle for rotatably supporting a work piece having a surface of revolution coaxial with the spindle, a reference disc secured on the spindle adjacent the chuck and having a cylindrical periphery coaxial with the axis of spindle rotation, bearing means in said work head axially parallel to the spindle and laterally offset from the reference disc, a horizontally disposed arm pivotally supported at one end by said bearing means, a shoe on the other end of the arm having a flat under face slidably supported by the upper portion of the reference disc in element-engagement therewith, a gauge mechanism including a gauge head adjustably supported by said arm, and a gauging finger pivotally mounted on said head and supported at one end on the surface being ground and responsive to the diameter of said surface of revolution.

8. In combination with a grinding machine having a rotatably driven horizontal spindle in a work head, a chuck on the spindle for rotatably supporting a work piece having a surface of revolution arranged to be ground coaxial with the spindle axis, a reference disc secured to the spindle adjacent the chuck and having a cylindrical periphery coaxial with the spindle, a rotatable and axially slidable horizontally disposed shaft journalled in the work head axially parallel to and laterally offset from the reference disc, an arm fastened at one end to move with said shaft, a shoe on the other end of the arm and having a flat face in supported engagement with the periphery of the disc above the spindle axis, gauge mechanism mounted on the arm and having a movable gauge point responsive to the size of said surface of revolution, and adjustable means to axially locate the position of said shaft.

9. In combination with a grinding machine having a rotatably driven horizontally disposed spindle in a work head, a chuck on the spindle for rotatably supporting a work piece having a surface of revolution arranged to be ground coaxial with the spindle, a reference disc mounted on the spindle and having a cylindrical periphery coaxial with the spindle, a rotatable and axially slidable shaft mounted in the work head parallel to said spindle and laterally offset from the reference disc, a horizontally disposed arm secured at one end to said shaft, a shoe on the other end of the arm having a flat face in element-riding contact with said cylindrical periphery above the spindle, gauge mechanism supported on said arm between the shoe and said shaft and having a movable gauge point engageable with the surface of revolution in a plane including the spindle axis and said element contact, and means to axially shift said shaft through a predetermined extent whereby the gauge mechanism will indicate the shape of said surface of revolution.

10. In combination with a grinding machine having a rotatably driven spindle, means on the spindle supporting and rotating a work piece during the grinding of a surface of revolution on the work piece coaxial with the spindle, a reference disc mounted on the spindle and having a circular periphery coaxial with the spindle, a rotatable and axially slidable shaft mounted on said machine parallel to said spindle and laterally offset from the reference disk, an adjustable member limiting the axially shiftable position of the shaft in one direction, means yieldably urging the shaft axially towards the adjustable member, an arm secured at one end to said shaft, the other end of said arm being engageable with and supported by the periphery of the reference disc above said spindle, a gauge head adjustably mounted on the arm, and a movable gauge member engageable with and responsive to the size of said surface of revolution during a grinding operation thereon.

11. In combination with a grinding machine having a rotatably driven spindle in a work head, a chuck on the spindle for rotatably supporting a work piece having a surface of revolution arranged to be ground coaxial with the spindle, a reference disc mounted on the spindle and having a cylindrical periphery coaxial with the spindle, a rotatable and axially shiftable shaft journalled in the work head parallel to the spindle and laterally offset from the reference disc, adjustable precision means limiting the axial position of the shaft in one direction, spring means urging the shaft towards said axial position, an arm secured at one end to said shaft, a shoe on the other end of the arm having a flat face arranged to be supported in sliding-element control with the disc periphery above the spindle, a gauge head secured to the arm, a movable gauge finger projecting from the head, and a gauge point on said finger engageable with said surface of revolution during a grinding operation thereon.

12. In combination with a grinding machine having a rotatably driven spindle, means on the spindle for supporting and rotating a work piece during the grinding of a surface of revolution on the work piece coaxial with the spindle, a circular reference disc secured to the spindle and having a periphery coaxial with the spindle, an arm pivotally supported at one end about a fixed axis, a gauge head carried by the arm, the other end of the arm being arranged for supported engagement on the disc periphery, a movable gauge finger in the head positioned during grinding by said surface of revolution, said arm being tiltably movable to swing the gauge mechanism into and out of operative position, and a counterweight for said arm which overbalances the gauge head when removed from said surface of revolution and which provides for light reference disc support of the arm when the gauge head is swung to operative position.

13. In combination with a grinding machine having a rotatably driven spindle, means on the spindle for coaxially supporting and rotating a work piece during the grinding of a surface of revolution on the work piece, a circular reference disc coaxial with and secured to said spindle, an arm mounted at one end for pivotal movement about a fixed axis on the grinding machine parallel to the spindle axis and laterally spaced from the disc, a shoe on the other end of the arm and supported by the disc above said spindle, a gauge head vertically adjustable on the arm, a gauging finger pivotally supported in the head, a gauge point on the finger engageable with the surface of revolution, and electrical mechanism responsive to the position of said finger to indicate the size of said surface of revolution.

14. In combination with a grinding machine having a rotatably driven spindle, a chuck on said spindle arranged to support a ring-shaped work piece for grinding internal and external surfaces of revolution thereon coaxial with the spindle axis, a circular reference disc mounted on the spindle and having a cylindrical periphery coaxial with the spindle axis, an arm pivotally mounted at one end on the grinding machine for movement about a fixed substantially horizontal axis parallel to the spindle axis and laterally offset from the reference disc, a shoe on the arm having a flat face slidably supported in element-contact with the reference disc periphery, a pair of gauge heads individually adjustable on the arm, a movable gauging finger pivotally supported in each head, one of said fingers having a gauge point engageable with said external surface of revolution during a grinding operation thereon, a gauge point on said other finger engageable with the internal surface of revolution during a grinding operation thereon, and indicating mechanism responsive to the individual positions of said gauge fingers whereby the internal and external surfaces of revolution may be ground coaxial to required sizes.

15. In combination with a grinding machine having a rotatably driven horizontally disposed spindle, means on the spindle rotatably supporting a work piece for grinding a work piece surface of revolution coaxial with the axis of spindle rotation, a reference disc fastened to the spindle and having a cylindrical periphery coaxial with the axis of spindle rotation, a substantially horizontal arm mounted at one end for pivotal movement about a fixed axis spaced from and parallel to the spindle axis, a shoe portion on the other end of said arm and slidably resting on the upper portion of the rotatable disc periphery to vertically locate the position of said arm with respect to the spindle axis, and a gauging mechanism mounted on the arm between said shoe and said pivoted end, and means on the gauging mechanism engageable with a peripheral portion of the work piece above said spindle axis.

References Cited in the file of this patent

UNITED STATES PATENTS

| | | |
|---|---|---|
| 2,116,232 | Blood | May 3, 1938 |
| 2,686,370 | Walker et al. | Aug. 17, 1954 |
| 2,984,953 | Neal | May 23, 1961 |